US012474896B2

(12) United States Patent
Tazmin et al.

(10) Patent No.: US 12,474,896 B2
(45) Date of Patent: Nov. 18, 2025

(54) SYSTEM AND METHOD FOR SOFTWARE DEVELOPMENT ON MOBILE DEVICES

(71) Applicant: Replit, Inc., Foster City, CA (US)

(72) Inventors: Laima Tazmin, San Francisco, CA (US); Matthew Chen, San Francisco, CA (US); Ian Kirkpatrick, San Francisco, CA (US)

(73) Assignee: Replit, Inc., Foster City, CA (US)

( * ) Notice: Subject to any disclaimer, the term of this patent is extended or adjusted under 35 U.S.C. 154(b) by 217 days.

(21) Appl. No.: 18/350,989

(22) Filed: Jul. 12, 2023

(65) Prior Publication Data

US 2024/0111501 A1    Apr. 4, 2024

Related U.S. Application Data

(60) Provisional application No. 63/377,871, filed on Sep. 30, 2022.

(51) Int. Cl.
G06F 8/34        (2018.01)
G06F 3/04845     (2022.01)
G06F 3/04886     (2022.01)
G06F 8/38        (2018.01)

(52) U.S. Cl.
CPC ............ *G06F 8/34* (2013.01); *G06F 3/04845* (2013.01); *G06F 3/04886* (2013.01); *G06F 8/38* (2013.01)

(58) Field of Classification Search
CPC ........................................................ G06F 8/34
See application file for complete search history.

(56) References Cited

U.S. PATENT DOCUMENTS

| | | | | |
|---|---|---|---|---|
| 9,870,205 B1 * | 1/2018 | Elliot | ................... | G06T 11/206 |
| 10,489,122 B1 * | 11/2019 | Abbott | .................. | G06F 8/34 |
| 11,119,735 B1 * | 9/2021 | Baafi | ...................... | G06F 8/33 |
| 11,442,702 B2 * | 9/2022 | Smith | .................. | G06F 40/284 |
| 12,076,868 B2 * | 9/2024 | Kang | .................... | B25J 9/1689 |
| 12,147,646 B2 * | 11/2024 | Jacobson | .............. | G06F 3/0483 |
| 12,360,747 B1 * | 7/2025 | Geusz | ................. | G06F 3/04842 |
| 2015/0339105 A1 * | 11/2015 | Koul | ........................ | G06F 8/33 |
| | | | | 717/113 |

(Continued)

FOREIGN PATENT DOCUMENTS

| | | | | | |
|---|---|---|---|---|---|
| CN | 109542420 A | * | 3/2019 | ............... | G06F 8/34 |
| CN | 110795085 A | * | 2/2020 | ............... | G06F 8/34 |
| WO | WO-2015160663 A1 | * | 10/2015 | ............... | G06F 8/33 |

OTHER PUBLICATIONS

CN-109542420-A: English Translation.*

*Primary Examiner* — Francisco J Aponte
(74) *Attorney, Agent, or Firm* — Blank Rome LLP

(57) ABSTRACT

An interactive coding environment is provided via an integrated mobile application. The interactive coding environment includes multiple user interface input elements including, but not limited to, a text editor, a virtual keyboard, a virtual autocomplete toolbar, a quick actions toolbar, and a virtual joystick. A user interacts with the coding environment via their user device, such as a mobile device. While coding within the text editor, the user is provided with auto-complete code suggestions and/or code snippets. Suggested inputs are obtained from a predictive model based on the user's input. A virtual joystick is provided to enable easy navigation within a text document shown within the text editor.

17 Claims, 16 Drawing Sheets

500A

(56) References Cited

U.S. PATENT DOCUMENTS

| | | | |
|---|---|---|---|
| 2016/0092414 A1* | 3/2016 | Kalyanasundaram | G06F 8/33 |
| | | | 715/234 |
| 2016/0098252 A1* | 4/2016 | Larsby | G06F 8/33 |
| | | | 717/113 |
| 2017/0052765 A1* | 2/2017 | Lee | G06F 8/42 |
| 2017/0052767 A1* | 2/2017 | Bennett | G06F 8/34 |
| 2017/0060541 A1* | 3/2017 | Saleh | G06F 8/34 |
| 2017/0320211 A1* | 11/2017 | Akan | G06F 8/34 |
| 2018/0181378 A1* | 6/2018 | Bakman | G06F 8/38 |
| 2020/0097261 A1* | 3/2020 | Smith | G06F 40/174 |
| 2020/0134488 A1* | 4/2020 | Kim | G06F 3/04842 |
| 2020/0142386 A1* | 5/2020 | Hitomi | G05B 19/4155 |
| 2022/0358286 A1* | 11/2022 | Wilson-Thomas | G06F 3/0482 |
| 2023/0266946 A1* | 8/2023 | Tee | G06F 8/20 |
| | | | 717/102 |
| 2023/0359442 A1* | 11/2023 | Ziegler | G06F 8/33 |
| 2023/0418565 A1* | 12/2023 | Arumugam Selvaraj | |
| | | | G06F 16/3322 |
| 2024/0111410 A1* | 4/2024 | Reardon | G06F 3/0486 |

\* cited by examiner

SYSTEM AND METHOD FOR SOFTWARE DEVELOPMENT ON MOBILE DEVICES

PRIORITY

This application claims the benefit of U.S. Provisional 63/377,871, filed Sep. 30, 2022, which is hereby incorporated by reference in its entirety.

FIELD OF THE INVENTION

The present application relates to mobile device applications and, more specifically, systems and methods for providing a computer code development interface and an operating system within a mobile device application.

BACKGROUND

Software development often requires developing or creating computer programs in the form of computer code that can be very lengthy and complex. To help simplify development of a computer program, code may be reused. Often, this reused code includes basic functionality or other code that can function as general-purpose building blocks that other code can use. These building blocks are often contained in code packages (e.g., namespaces, libraries, etc.) and provide sets of classes, interfaces, objects, etc. that often can be included in the computer program being developed. Each code package called by the computer program under development is included with and functions as a part of the computer program when the computer program is executed. As such, code packages called by the computer program under development should be accessible when needed, for example, by a compiler, interpreter, or integrated development environment (IDE). While there are standardized code packages available, any developer could create and distribute their own code package. Additionally, a computer program under development often references (e.g., calls) ten, if not hundreds of code packages.

A software developer attempting to code in a mobile environment, such as via a tablet PC or smartphone, would find coding too cumbersome and impractical. Most smartphones in use today have dispensed with a physical keyboard (e.g., a QWERTY keyboard) and instead provide a virtual keyboard via user interface elements. With the unavailability of a physical keyboard, most software developers would balk at the chance to code in a mobile environment because of the limited visual space and limited navigation features currently available in the art. Therefore, a networked, interactive, and integrated coding environment for enhancing a user's coding experience including characteristics making the selection of packages and other coding actions easier despite the lack of a keyboard would be helpful.

BRIEF SUMMARY OF THE INVENTION

The present embodiments may relate to, inter alia, systems and methods for providing a mobile integrated development environment (IDE) platform. Some embodiments of the present disclosure may use, for example, a graphical user interface (GUI) that includes, but is not limited to, a code-editing interface, a code-aware auto-complete interface, and an input interface. The GUI may include, for example, a coding keyboard, a joystick/nib, a quick actions menu, or the like. In some embodiments, the GUI may be provided to a user via a mobile device, such as a smartphone, that is connected over a network to a server of the platform. The platform server may connect the mobile device with, for example, application program interfaces (APIs), databases, Web Services, other users of the platform, or the like.

In one or more embodiments, user inputs may be received via a GUI of a mobile application running on a user device, such as a mobile device, in a virtual operating system (OS) environment. A virtual representation of an operating system, such as Linux OS or the like, may be provided. Within the virtual OS environment, a text editor may be provided enabling a user to code and write computer programs. The text editor may be enabled to support different programming or markup languages, such as Java, Python, C++, HTML, etc. Navigation of the text entered by a user may be enabled via a virtual input device, such as a virtual joystick displayed in relation to the editor screen. Alternatively, navigation may be performed via the screen of the user's mobile device, such as a finger swipe. Cursor movement within the text of the text editor may be moved around based on the user's input, may it be via the joystick, a user swiping action, or both.

In one or more embodiments, the GUI of the mobile application may provide a virtual keyboard displayed in relation to the text editor interface. During user input, or while the user is coding, one or more suggestions may be provided to the user in an area close to the keyboard interface. This defined area may be associated with the keyboard as an autocomplete toolbar, for example. Suggestions may be made to the user based on different parameters, such as the coding language (e.g., Java or HTML), syntax rules of the coding language, user experience level (e.g., beginner, intermediate, expert), type of project (e.g., website features, a game, ecommerce platform), common input types (e.g., symbols), previous code entered by the user (e.g., previously defined variables, classes, function names, etc.) or by user with a similar profile to that user, auto-completion of language keywords/syntax, auto-completion of symbols from imports (e.g., symbols defined in other modules that have been "imported" into the document), autocompletion of content related to a particular API the user may be working with, ecommerce actions (purchase of goods or services, purchase of virtual currencies or cryptocurrencies and the like), AI or machine learning generated language, auto-completion of symbols defined within the current document, symbols frequently used in the language or file format, suggestions navigate within a document, suggestions to make probable changes or edits, or the like.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

For a detailed description of various examples, reference will now be made to the accompanying drawings.

FIGS. 5A-5I depict exemplary user display implementations in accordance with one or more embodiments of the disclosure.

Figure 1:
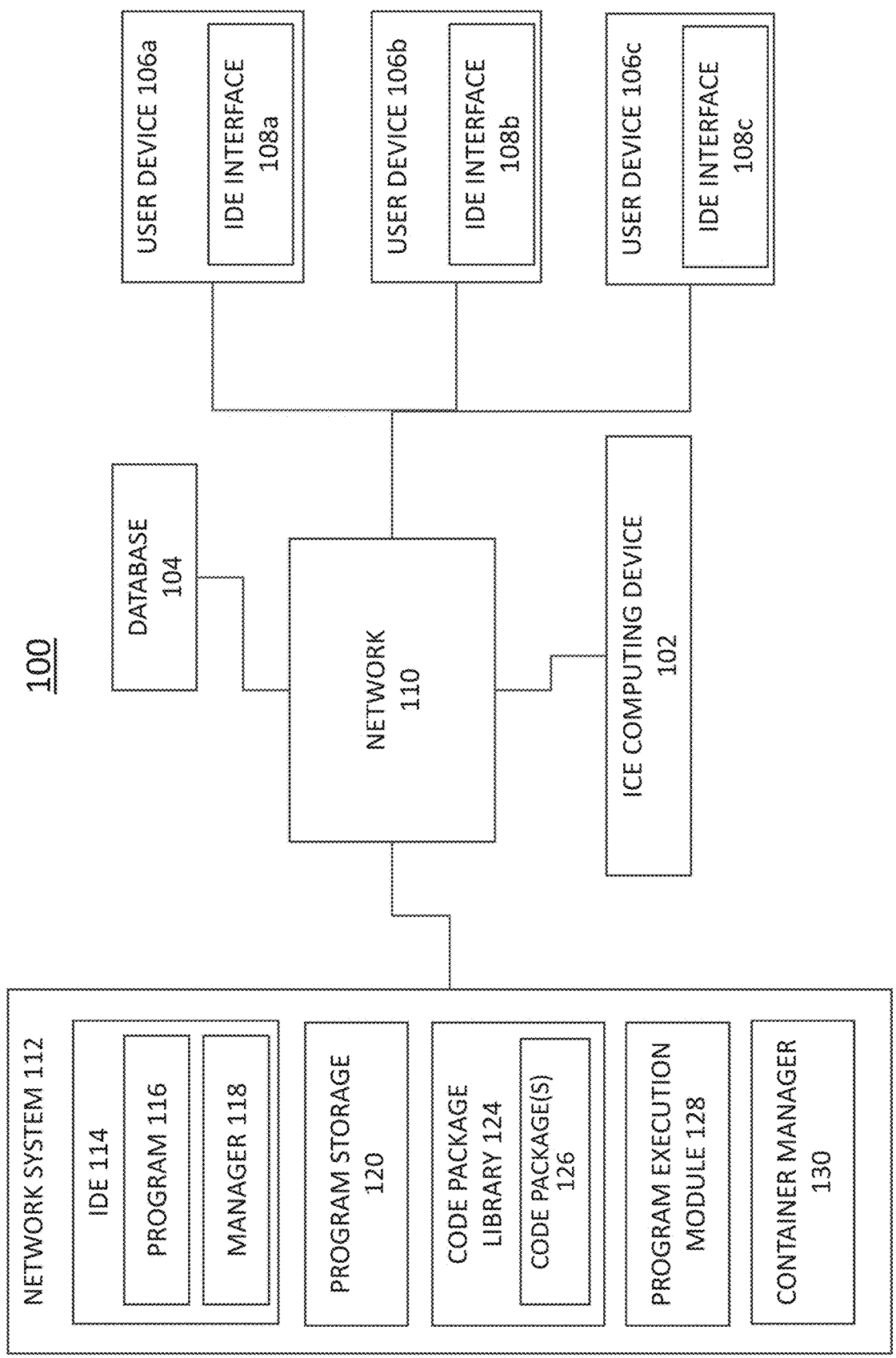
FIG. 1 depicts an exemplary interactive coding environment (ICE) computing system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

In the following description, numerous specific details are set forth to provide a thorough understanding of the various techniques. As parts of this description, some of the drawings represent structures and devices in block diagram form. In this context, references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, the particular flow of any flow diagram is used only to exemplify one embodiment. In other embodiments, any of the various components depicted in the flow diagram may be omitted or the components may be performed in a different order or even concurrently. In addition, other embodiments may include additional steps not depicted as part of the flow diagram. Further, the various steps may be described as performed by modules or components. The language used in this disclosure has been principally selected for readability and instructional purposes and may not have been selected to delineate or circumscribe the disclosed subject matter. As such, the various processes may be performed by alternate components than the ones described.

Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

The present embodiments may relate to, inter alia, systems and methods for providing a coding platform for users or developers, where users may create, edit, develop and run programs in a mobile environment. Users may be provided with an opportunity to perform actual coding and not "low code." Further, users are provided with a coding environment that requires more advanced text input beyond merely using predictive text or voice dictation. A mobile environment typically includes environments where screen real estate is limited, such as a smartphone running a mobile operating system (e.g., iOS, Android). Other mobile environments may include, but is not limited to, a smart fridge or appliance that includes a screen, a wearable device (e.g., a smart watch), or the like. In the exemplary embodiments, a user, via their mobile device, may launch an application providing a virtual operating system (OS) environment, such as mobile Linux OS. In some embodiments, the application may provide a series of user interface (UI) elements including, but not limited to, a program menu, a text editor, a virtual keyboard, an auto-complete or suggestions bar and a joystick control. In at least one exemplary embodiment, the process may be performed and implemented by an exemplary interactive coding environment (ICE) computing device described herein.

FIG. 1 depicts an exemplary interactive coding environment (ICE) system 100. ICE system 100 may include an ICE computing device 102. ICE computing device 102 may be communicatively coupled to a database 104 that stores data via network 110. In one embodiment, database 106 may be a local storage device. In another embodiment, database 104 may be a remote storage device, such as cloud storage, or the like. ICE computing device 102 may be in communication with a plurality of user devices 106 (e.g., 106*a*, 106*b* and 106*c*). In some embodiments, the plurality of user devices 106 may be associated with application developers, coders, or the like. User devices 106 may be communicably connected to a network system 120 across a network 110. Although a particular representation of components and modules is presented, in some embodiments, the various components and modules may be differently distributed.

User devices 106*a*, 106*b* and 106*c* (collectively 106) may each be computing devices which may access one or more integrated development environments (IDE). An IDE is computer software that provides tools used by programmers to develop software. The IDE may include, for example, a source code editor, command interface, debugger, and other programming tools. The IDE 114 may be hosted on one or more network devices of network system 112. The IDE 114 may be accessed across the network 110 via an IDE interface from each user, such as IDE interface 108*a*, IDE interface 108*b*, and IDE interface 108*c* (collectively 108). The IDE interface may be an application running on the corresponding user device, may be provided as an instance on a server device and accessed by a user device via a web browser, or the like. In some embodiments, the IDE interface may be provided by a virtual OS application running on a user's mobile device, such as a Linux OS application running on a user's mobile device natively running iOS or Android. Each user 106 may access a different IDE 114 from their respective IDE interface 108, or multiple users may access the same IDE 114. The IDE interface of each user device may provide access to code for computer program 116 along with one or more code packages 126 that may be referenced by the computer program 116 being developed. The computer program 116 may be the focus of a development session by one or more programmers on any of user devices 106.

Each user 106 may access a different IDE from their respective IDE interface, or multiple users 106 may access the same IDE. The IDE interface of each user device may provide access to code for a computer program along with one or more code packages that may be referenced by the computer program being developed. The computer program may be the focus of a development session by one or more programmers on any of user devices 106.

In some embodiments, a user's IDE may access the computer program 116 stored in a computer program storage, such as in database 106 or program storage 120. This computer program storage 120 may be a storage space provided on a per account basis. For example, an account may be associated with an individual developer (e.g., user) developing the computer program, or the account may be an organizational account associated with an organization, such as a company, corporation, etc., with multiple developers' (e.g., users') sub-accounts associated with the organizational account developing the computer program. In some cases, multiple computer programs may be associated with a single account.

Code specific for the computer program, along with other data for the computer program (e.g., images, data files, etc.), may be stored in the computer program storage 120, and the computer program storage 120 may be allotted a certain amount of available storage, for example, based on a status, service tier, type, etc. of the account. In some cases, the computer program storage 120 may be a part of a container, such as a docker container, or part of a virtual machine image. The computer program storage 120 may also be hosted, for example, on a cloud service, such as Google Cloud Platform (Google is a registered trademark of Google LLC), Amazon Web Services (Amazon Web Services is a registered trademark of Amazon Technologies, Inc.), etc. The computer program 116 may be written in any known computer programming language (e.g., Java, C++, Python) or markup language (e.g., HTML, XML).

In some embodiments, the code of the computer program 116 may include a reference to one or more code packages. Additionally, or alternatively, the referenced code packages may be contained in the computer program storage 120. For example, the computer program 116 may reference a code package that is associated with (e.g., developed by) the account and stored in the computer program storage 120. In such cases, the computer program may be executed as stored in the computer program storage 120 (e.g., based on the code package stored in the computer program storage). In other embodiments, the referenced code package may be stored in a code package library 124 separate from the computer program 116. For example, the computer program 116 may reference any number of code packages stored in a code package library 124.

The code package library 124 includes a plurality of code packages and may be in a storage separate from the computer program storage 120. For example, the code package library 124 may be stored as a separate instance on a user's local device, a third-party server, a remote database 106 or a hosted cloud service. In some cases, the cloud service hosting the code package library 124 may be the same cloud service hosting the computer program storage 120, while the code package library 124 is contained in a separate instance from the computer program storage 120. For example, the computer program 116 may be stored in a container hosted on the cloud service, while the code package library 124 may be stored as a shared persisted drive hosted on the same cloud service. Hosting the computer program 116 and code package library 124 in the same cloud service helps allow for quicker execution times as hosting on the same cloud services allows for co-location within a hosted data center or region.

The code package library 124 may contain any number of pre-compiled code packages. In some cases, the code package library 124 may contain code packages for any supported programming language and/or multiple versions of the same code package. These code packages may be pre-compiled, for example, to a native machine code for execution by the network system 112 or pre-compiled to an intermediate code, such as a byte code, depending on the programming language and compiler system. The IDE 114 includes a code package manager 118 for managing and disambiguating the code packages 126. The code package manager 118 may be any known code package manager and may disambiguate the code packages 126, for example, based on an index number assigned to each code package. Code packages 126 may be stored, for example, in directories in the code package library 124 based on these index numbers. The code package manager 118 may also provide a user interface (not shown) for developers to use when selecting code packages 126 for the computer program 116.

Figure 2:
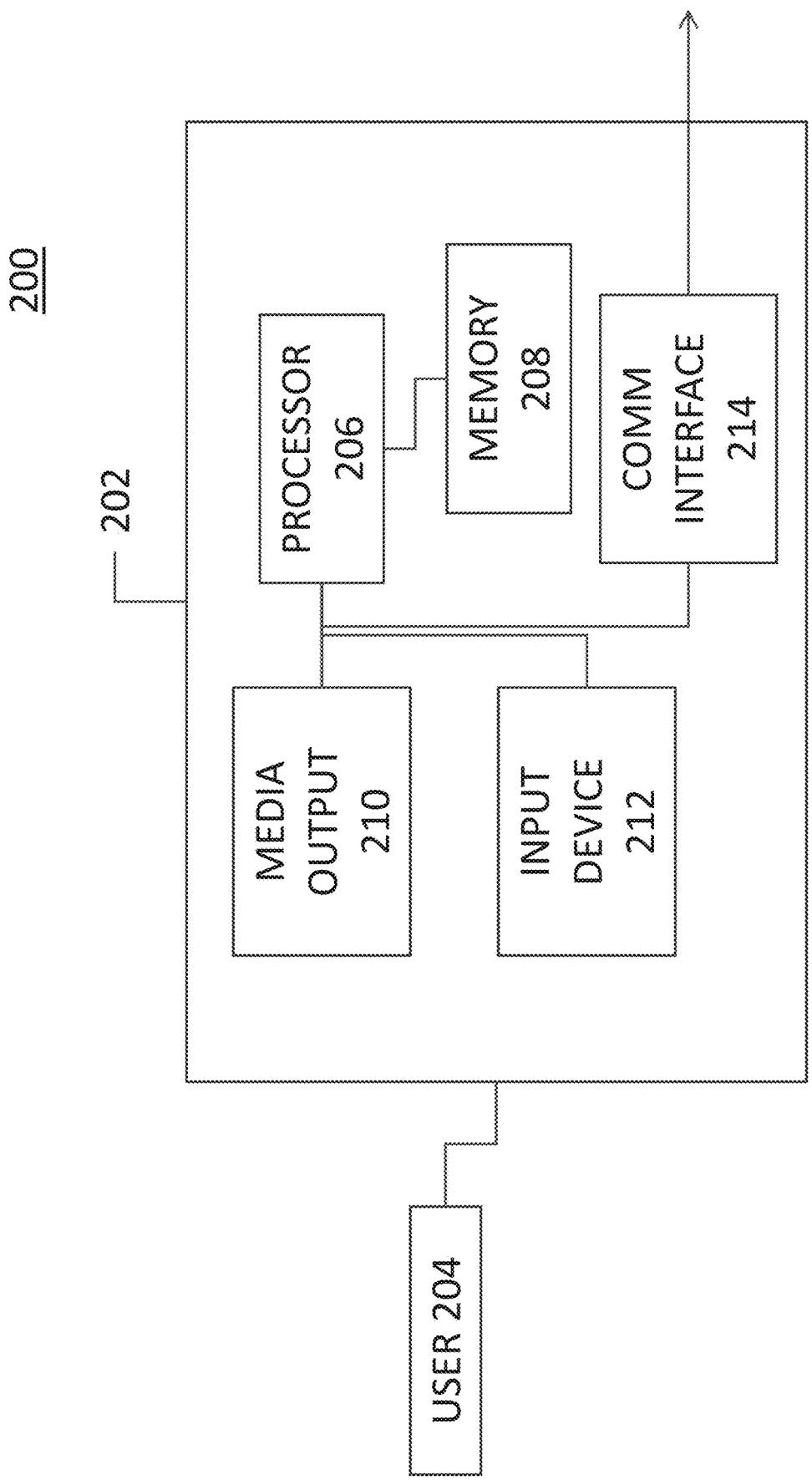
FIG. 2 depicts an exemplary client computing device that may be used with the ICE computing system illustrated in FIG. 1.

FIG. 2 depicts an exemplary configuration 200 of a user computer device 202, in accordance with one embodiment of the present disclosure. User device 202 may be operated by a user 204. User device 202 may include, but is not limited to, user devices 106 (shown in FIG. 1). User device 202 may include a processor 206 for executing instructions. In some embodiments, executable instructions may be stored in a memory 208. Processor 206 may include one or more processing units (e.g., in a multi-core configuration). Memory 208 may be any device allowing information such as executable instructions and/or transaction data to be stored and retrieved. Memory 208 may include one or more computer readable media.

User device 202 may also include at least one media output component 210 for presenting information to user 204. Media output component 210 may be any component capable of conveying information to user 204. In some embodiments, media output component 210 may include an output adapter (not shown) such as a video adapter and/or an audio adapter. An output adapter may be operatively coupled to processor 206 and operatively coupleable to an output device such as a display device (e.g., a cathode ray tube (CRT), liquid crystal display (LCD), light emitting diode (LED) display, "electronic ink" display or an audio output device (e.g., a speaker or headphones).

In some embodiments, media output component 210 may be configured to present a graphical user interface (e.g., a web browser and/or a client application) to user 204. In some embodiments, user device 202 may include an input device 212 for receiving input from user 204. User 204 may use input device 212 to, without limitation, provide user data and mobile application data to ICE computing device 102 (shown in FIG. 1) and grant and/or deny providers access to user data and mobile application data. Alternatively, user 204 may use input device 212 to interact with a user interface to create, edit and navigate within a coding environment user interface.

Input device 212 may include, for example, a keyboard (virtual or physical), a pointing device, a mouse, a stylus, a touch sensitive panel (e.g., a touch pad or a touch screen), a virtual input element (e.g., a virtual joystick), and/or an audio input device. For example, virtual input components may be presented as graphical objects on a user interface presented on a touch screen, from which a user can interact with the virtual input components. A single component such as a touch screen may function as both an output device of media output component 210 and input device 212.

User device 202 may also include a communication interface 214 communicatively coupled to a remote device such as ICE computing device 102 (shown in FIG. 1). Communication interface 214 may include, for example, a wired or wireless network adapter and/or a wireless data transceiver for use with a mobile telecommunications network.

Stored in memory 208 are, for example, computer readable instructions for providing a user interface to user 204 via media output component 210 and, optionally, for receiving and processing input from input device 212. A user interface may include, among other possibilities, a web browser and/or a client application. The client application enables users, such as user 204, to display and interact with an interactive GUI from ICE computing device 102. For example, instructions may be stored by a cloud service, and the output of the execution of the instructions may be sent to the media output component 210.

Figure 3:
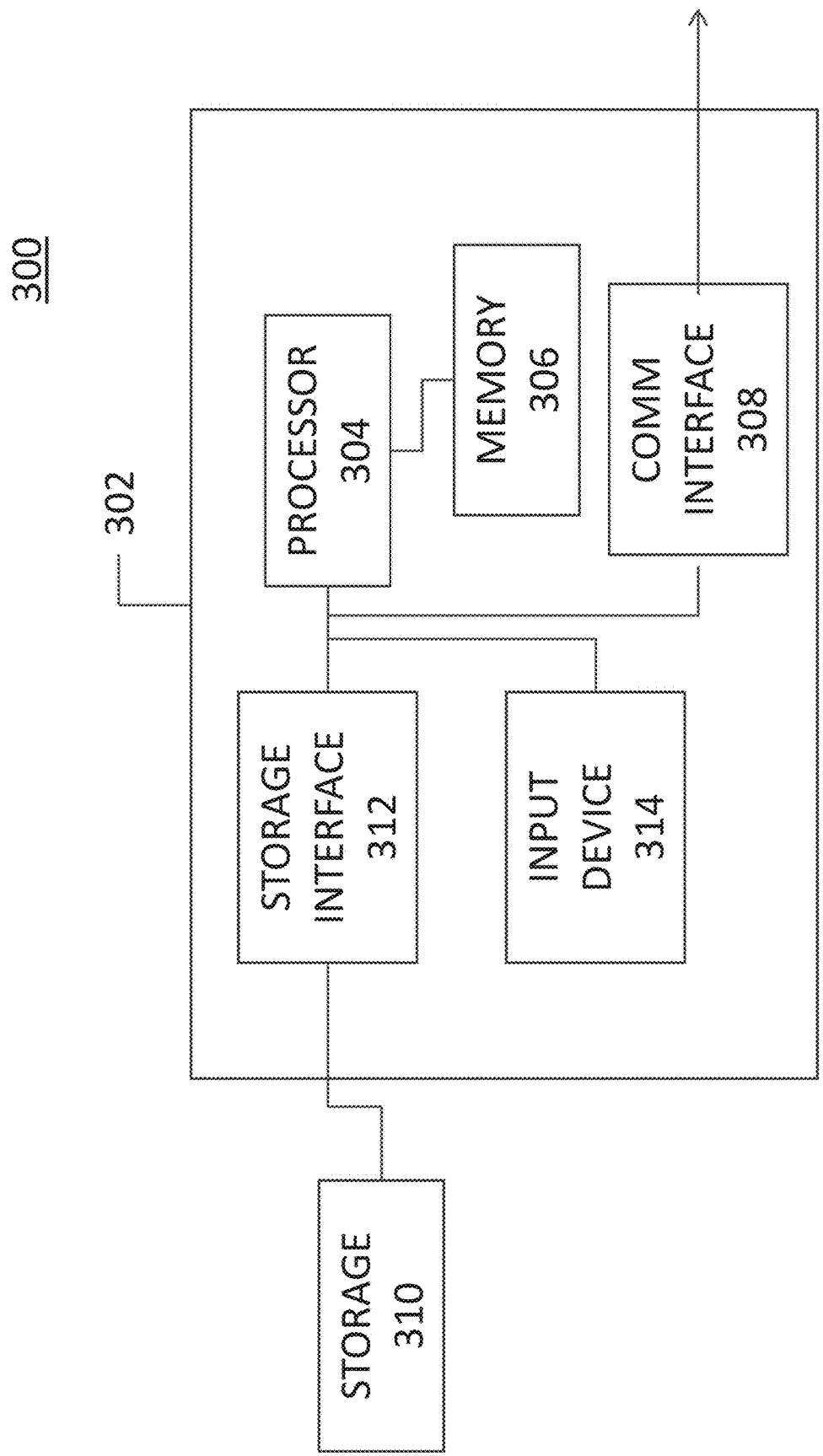
FIG. 3 depicts an exemplary server computing device that may be used with the ICE computing system illustrated in FIG. 1.

FIG. 3 depicts an exemplary configuration of server system 300, in accordance with one embodiment of the present disclosure. Server computer device 302 may include, but is not limited to, ICE computing device 102 (shown in FIG. 1). Server computer device 302 may also include a processor 304 for executing instructions. Instructions may be stored in a memory 306. Processor 304 may include one or more processing units (e.g., in a multi-core configuration)

Processor 304 may be operatively coupled to a communication interface 308 such that server computer device 302 is capable of communicating with a remote device, such as another server computer device 302 or ICE computing device 102. For example, communication interface 308 may receive input from user device 106 via the Internet, as illustrated in FIG. 1. Additionally, or alternatively, server computer device 302 may receive data input from an input device 314.

Processor 304 may also be operatively coupled to a storage device 310. Storage device 310 may be any computer-operated hardware suitable for storing and/or retrieving data, such as, but not limited to, data associated with database 106 (shown in FIG. 1). In some embodiments, storage device 310 may be integrated in server computer device 302. For example, server computer device 302 may include one or more hard disk drives as storage device 310.

In other embodiments, storage device 310 may be external to server computer device 302 and may be accessed by a plurality of server computer devices 302. For example, storage device 310 may include a storage area network (SAN), a network attached storage (NAS) system, and/or multiple storage units, such as hard disks and/or solid-state disks in a redundant array of inexpensive disk (RAID) configurations.

In some embodiments, processor 304 may be operatively coupled to storage device 310 via a storage interface 312. Storage interface 312 may be any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Processor 304 may execute computer-executable instructions for implementing aspects of the disclosure. In some embodiments, the processor 304 may be transformed into a special purpose microprocessor by executing computer-executable instructions or by otherwise being programmed.

Figure 4:
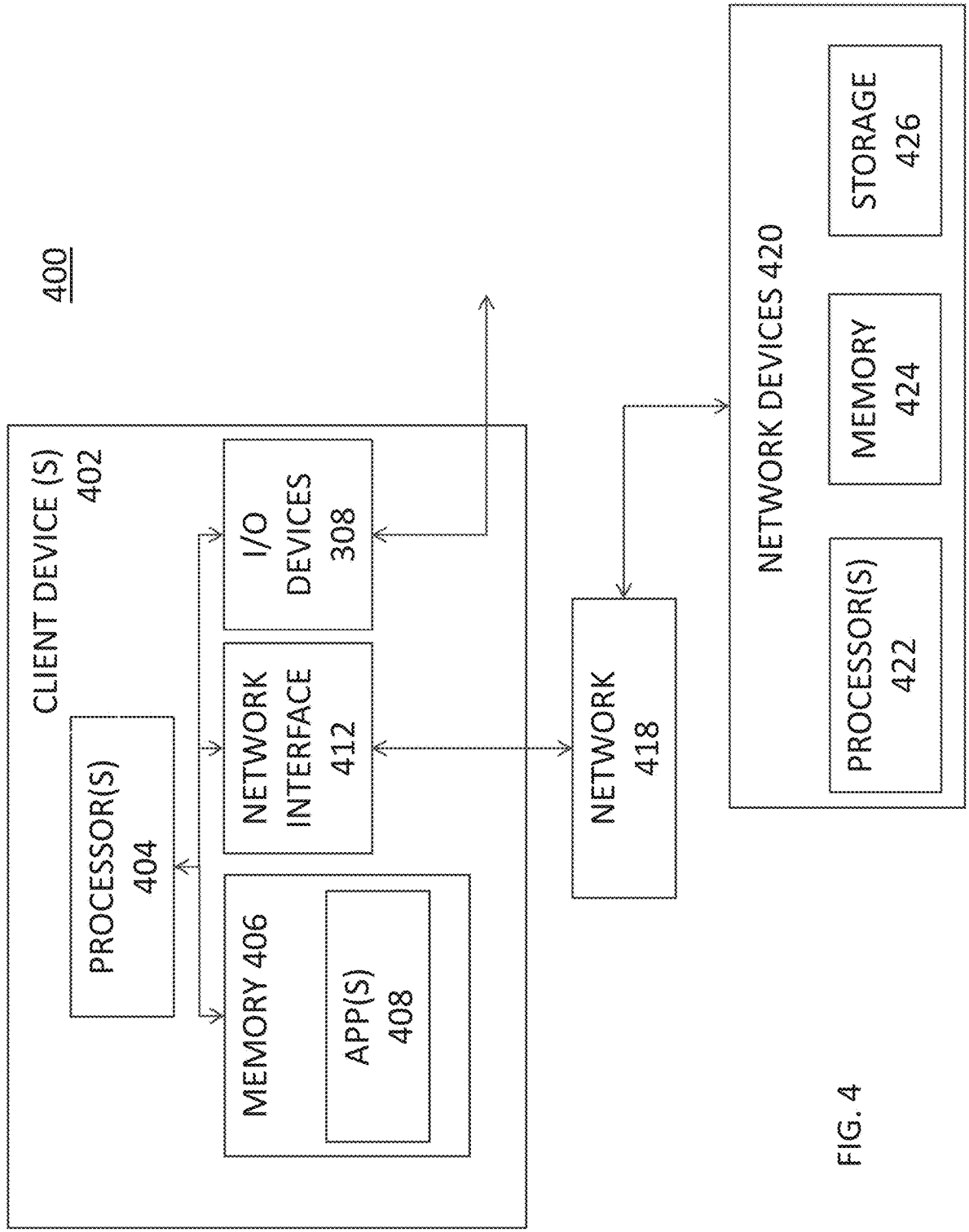
FIG. 4 depicts an example of a hardware system for implementation of the ICE in accordance with the disclosed embodiments.

FIG. 4 shows an example of a hardware system for implementation of the interactive coding environment in accordance with the disclosed embodiments. FIG. 4 depicts a network diagram 400, including a client computing device 402 connected to one or more network devices 420 over a network 418. Client computing device 402 may include, but is not limited to, user computing devices 106 (shown in FIG. 1) Client device 402 may comprise a personal computer, a tablet device, a smart phone, network device, or any other electronic device that may be used to facilitate a coding environment. The network 418 may comprise one or more wired or wireless networks, wide area networks, local area networks, short range networks, and the like. Users of the client devices 402 can interact with the network devices 420 to access services controlled and/or provided by the network devices 420.

Client devices 402 may include one or more processors 404. Processor 404 may include multiple processors of the same or different type and may be configured to execute computer code or computer instructions. Client devices 402 may also include a memory 406. Memory 406 may each include one or more different types of memory, which may be used for performing functions in conjunction with processor 404. For example, memory 406 may include cache, ROM, RAM, or any kind of transitory or non-transitory computer readable storage medium capable of storing computer readable code. Memory 406 may store various programming modules and applications 408 for execution by processor 404.

Computing device 402 also includes a network interface 412 and I/O devices 414. The network interface 412 may be configured to allow data to be exchanged between computing devices 402 and/or other devices coupled across the network 418. The network interface 412 may support communication via wired or wireless data networks. Input/output devices 414 may include one or more display devices, keyboards, keypads, touchpads, mice, scanning devices, voice or optical recognition devices, or any other devices suitable for entering or retrieving data by one or more client devices 402.

Network devices 420 may include similar components and functionality as those described in client devices 402. Network devices 420 may include, for example, one or more servers, network storage devices, additional client devices, and the like. Specifically, network device may include a memory 424, storage 426, and one or more processors 422. While the various components are presented in a particular configuration across the various systems, the various modules and components may be differently distributed across the network.

Figure 5A:
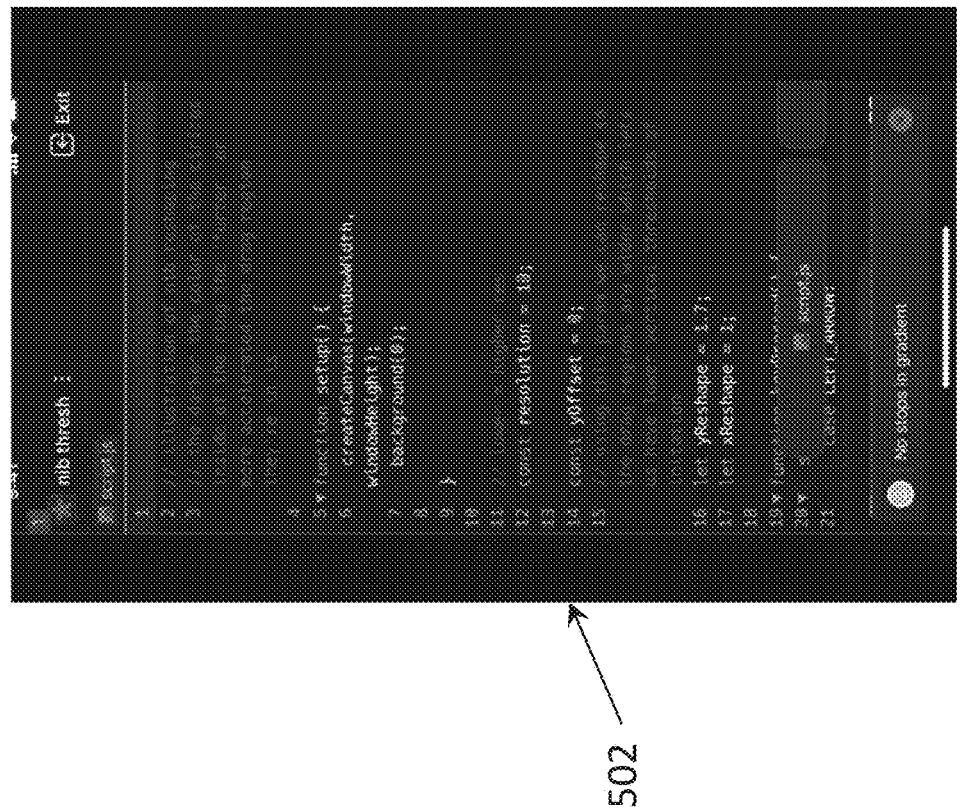

FIGS. 5A-5D depict exemplary coding environment interfaces 500 that may be provided to a user via a client device, such as a client device 106 (shown in FIG. 1). As described herein, the interface may be provided by a mobile application loaded by the device and configured to provide a mobile OS, such as Linux OS. As shown in FIG. 5A, a text editor module 502 may be provided for display to a user for editing code within the coding environment. Based on the syntax of the type of program being coded, different elements of the program code may appear in different font styles, colors, or the like. In some examples, different characters may be used, such as characters to enclose program routines, function calls, or the like. Additionally, or alternatively, comments within the code may be shown. In this example, comments are shown using two forward slashes ("II"). A user may load a program for editing in the text editor of the coding container. The program may be loaded from a local storage device or an external device, such as from a remote server, cloud storage device, or the like. In some embodiments, a plurality of users may have access to the same program for editing to enable collaboration between multiple users.

Figure 5B:
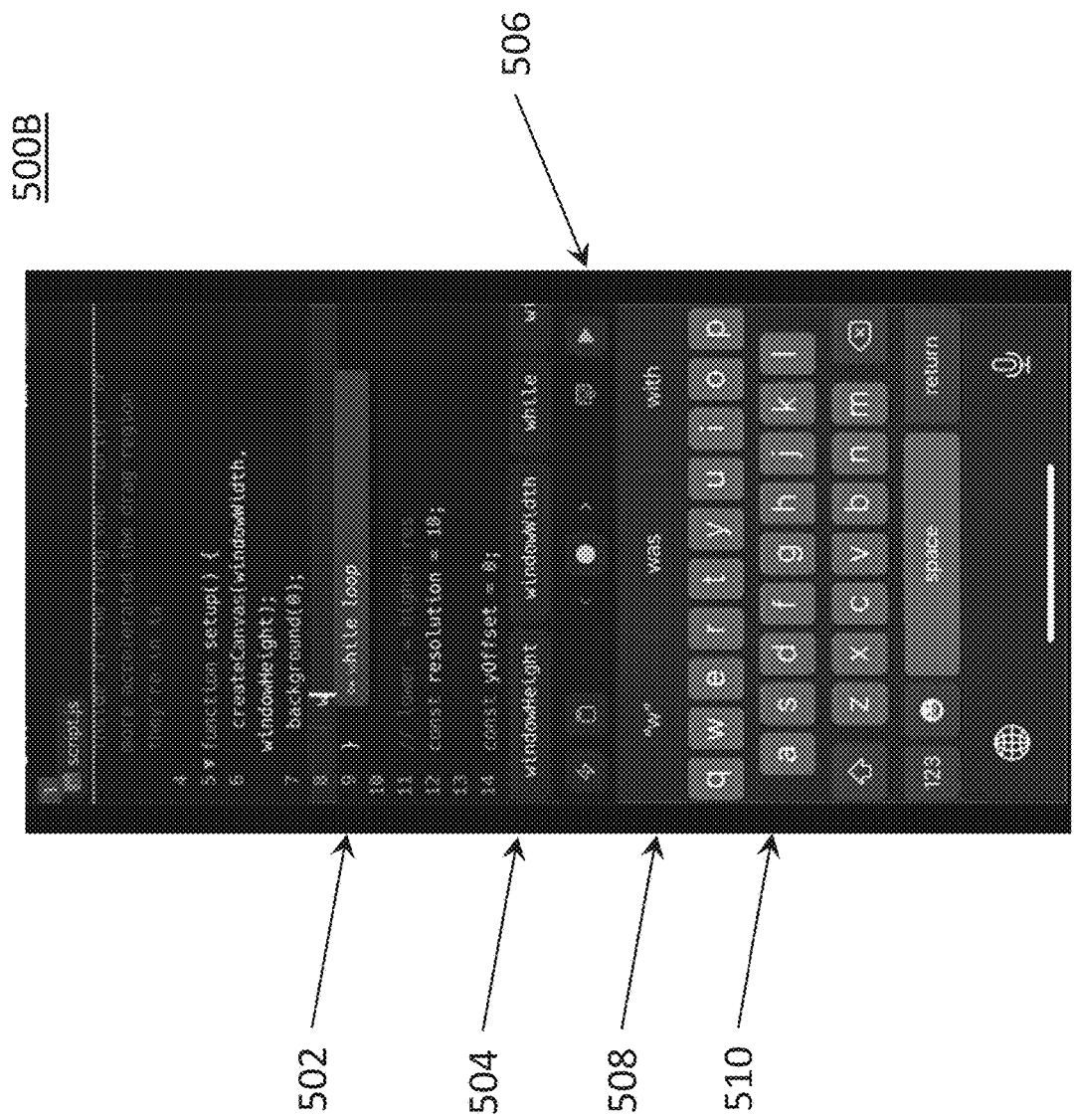

In FIG. 5B, an example user interface 500B is shown for a coding environment. The user interface 500B may be provided, for example, by IDE interface 108a via user device 106*a* shown in FIG. 1. As shown in FIG. 5B, text editor module 502 is provided along with additional interface elements, including a code suggestion element 504, an autocomplete toolbar interface element 506, an autocomplete element 508, and a virtual keyboard element 510. In some embodiments, the additional interface elements may be code-aware interface elements. For example, when input is received by text editor module 502, one or more actions may be triggered based on the received input. Triggered actions may be based on various parameters including, but not limited to, code language (e.g., Javascript, Python, PHP), the text inputted, code syntax, classes or objects, or the like. A triggered action may include the retrieval of one or more coding suggestions. In one example, one or more coding suggestions may be retrieved from a networked storage location, such as program storage 120, over a network, such as network 110, as shown in FIG. 1. The one or more coding suggestions retrieved may be based on one or more of the various parameters. The one or more parameters may also include current user input (e.g., when user starts inputting a "w" via the virtual keyboard, the toolbar 504 may be caused to show suggestions of code that start with w, such as "while" or "windowHeight"), common code snippets, keywords based on the language, keyword scoring based on the user, or the like. Continuing with the example, interface element 504 may display the one or more coding suggestions for selection. Additionally, interface element 506 may provide multiple icons for selection that allows interaction with the text editor. Interface elements may include, but are not limited to, a quick actions icon, a clipboard icon, a virtual joystick, a hide keyboard icon, and a play/run button. Interface element 508 provides an autocomplete feature and element 510 provides a virtual keyboard.

Figure 5C:
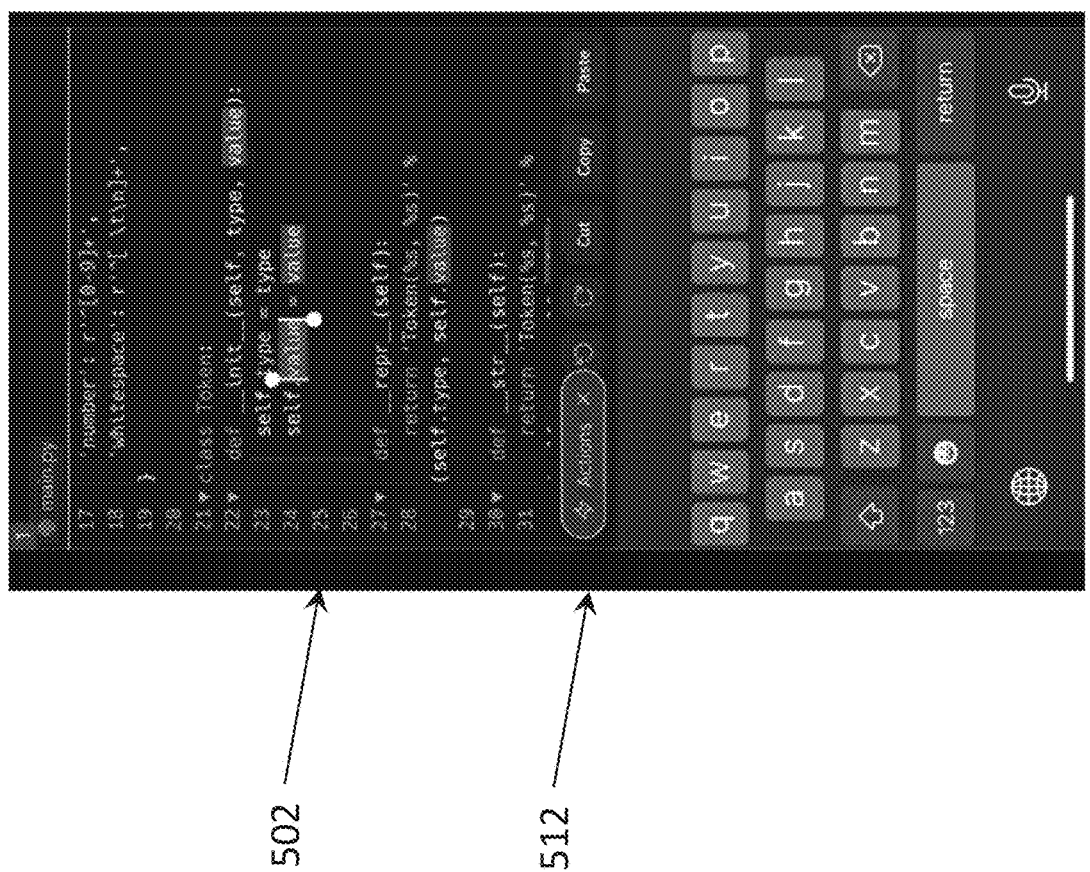

In FIG. 5C, an example user interface 500C is shown. As shown in FIG. 5C, when the quick actions icon is selected within toolbar 512, multiple icons may be shown to perform actions within text editor 502. Quick actions may include, but are not limited to, undo, redo, cut, copy, and paste, or the like. In some embodiments, quick actions may be user-customizable. In this example, the text "value" has been selected within text editor 502 and one or more quick actions may be selected to interact with the selected text (e.g., copy the text, cut the text).

Figure 5D:
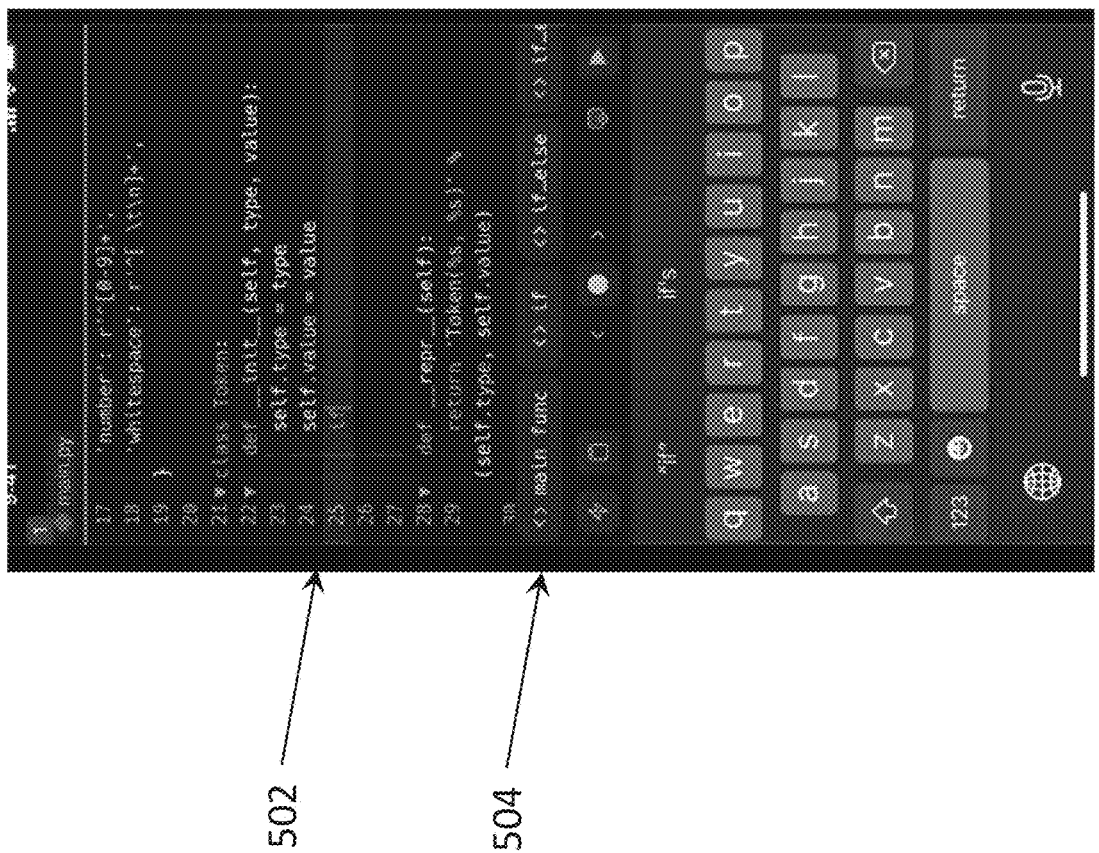

In FIG. 5D, an example user interface 500D is shown. As shown in FIG. 5D, while editing a program, interface element 504 may provide one or more code snippet suggestions for selection. In some embodiments, the additional interface elements may be code-aware interface elements. For example, when input is received by text editor module 502, one or more actions may be triggered based on the received input. Triggered actions may be based on various parameters including, but not limited to, code language (e.g., Javascript, Python, PHP), the text inputted, code syntax, classes or objects, or the like. A triggered action may include the retrieval of one or more coding snippets. In one example, one or more coding snippets may be retrieved from a networked storage location, such as program storage 120, over a network, such as network 110, as shown in FIG. 1. The one or more coding snippets retrieved may be based on one or more of the various parameters. Upon selection, a selected code snippet may be added or inserted into the document 502, wherever the cursor focus is within the document. Provided code suggestions may be tailored to the programming language of the text document. For example, when coding in Python, only code snippets that are within the Python language are retrieved and displayed for selection. Additionally, or alternatively, suggested code snippets may be displayed for selection because they are considered commonly used code snippets. Suggestions may be provided, for example, by using one or more language/file format keywords. In some embodiments, a programming language (e.g., Python) or a file format (e.g., CSS, HTML) may have one or more frequently used keywords or syntax. In another example, a suggestion may be provided using certain language/file format snippets. A code snippet is a short template for frequently used sections of a document. A code snippet may include, for example, a class definition in Python or a <div> . . . </div> tag in HTML. In yet another embodiment, a suggestion may include imported and known symbols. For example, a text document being coded by the user may be analyzed to extract one or more symbols defined in the document, for example, imported modules in Python, class names, function names, variable names, or the like. Even further, a suggestion may include one or more types of common input for selection by the user while coding. For example, certain symbols (e.g., < or >) may be provided as suggestions for selection within toolbar 504, especially ones that are typically difficult to type using a virtual keyboard UI, which may also be commonly referred to as an Input Method Editor. Additionally, or alternatively, symbols to suggest may be selected based on the type of language or file format being edited within text editor 502. For example, suggestions may be retrieved from a library of suggestions, such as code package library 124 shown in FIG. 1. Suggested code symbols selected by the interactive development interface (IDE) may be code-aware and therefore select symbols that are associated with languages or file formats that frequently use the symbols. In some embodiments, a symbol suggestion may be made based on recently typed text received within text editor 502. For example, if "<" was received as input to text editor 502, the IDE may cause one of the suggested elements within toolbar 504 to be ">" for selection. Upon selection of ">" within toolbar 504, the symbol would be inserted within the code shown in text editor 502, based on a location of a cursor within the text editor. A code snippet library may be curated to include a selection of common code snippets of programming languages or file formats. The code snippet library may be stored locally for quick retrieval by the IDE, for example within memory 208 of a client device 202 shown in FIG. 2. Alternatively, the code snippet library may be stored remotely and accessible over a network, for example code package library 124 over network 110. Additionally, common code snippets may be added to the code snippet library with plain English descriptors.

Figure 5E:
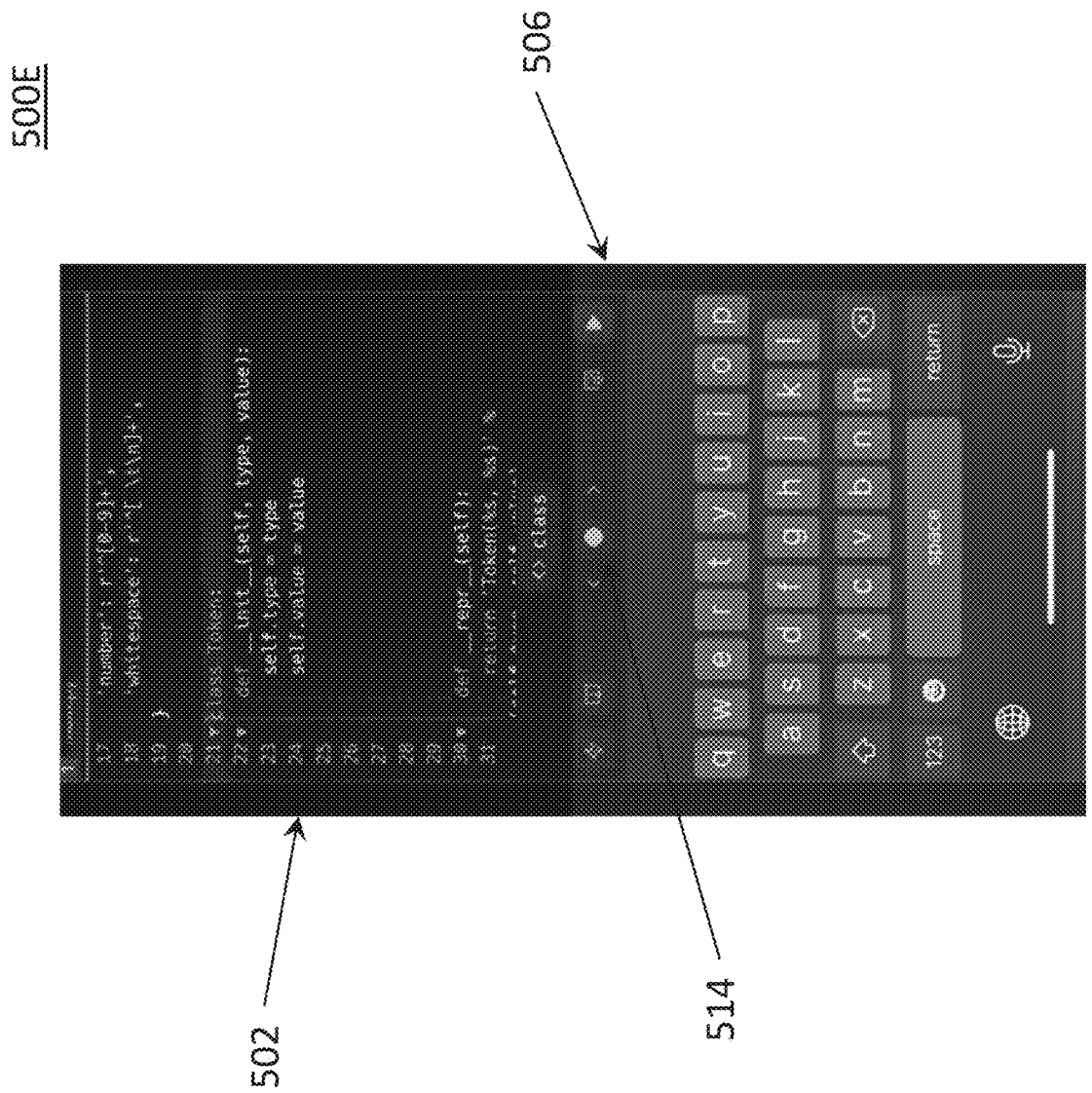
Figure 5F:
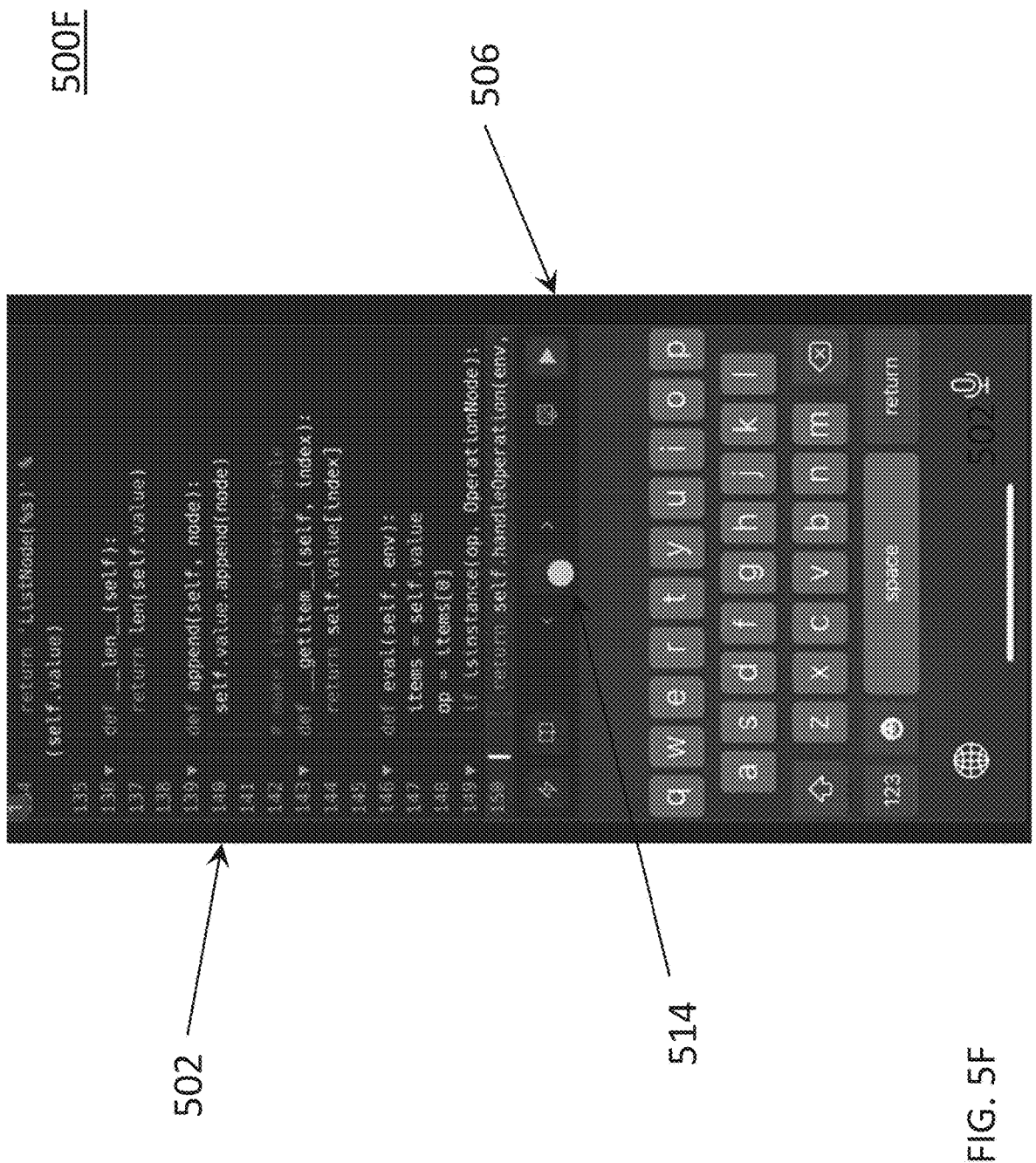
Figure 6:
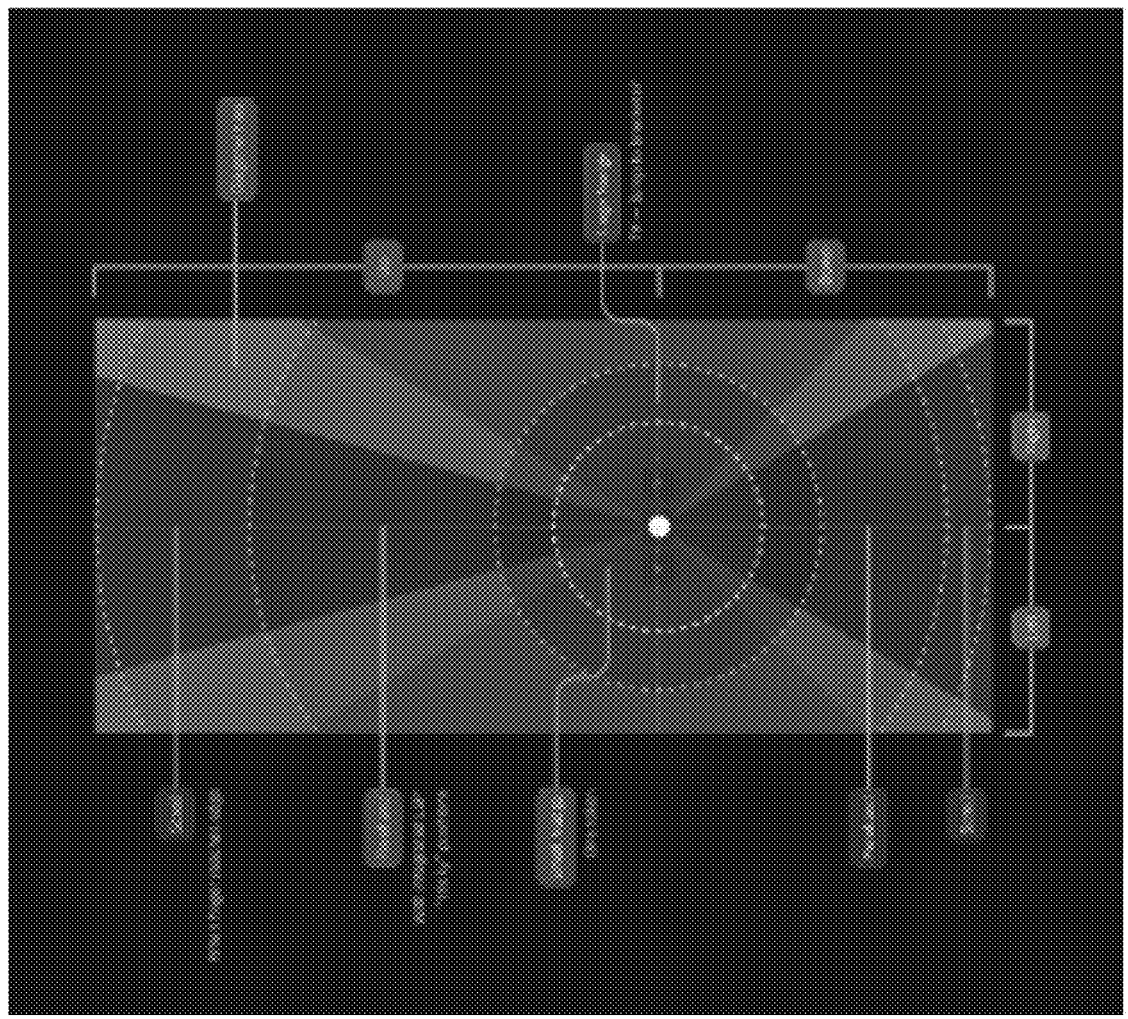
FIG. 6 depicts an exemplary drag region diagram of a user input element in accordance with one or more embodiments of the disclosure.

FIGS. 5E and 5F depict interactive GUIs 500E and 500F, respectively, that include a moveable joystick controller 514. The joystick controller 514 may be visually represented as a draggable dot in the middle of the autocomplete toolbar 506. Joystick controller 514 may be used to perform one or more navigation functions with text editor 502. For example, joystick 514 may be a draggable and tappable UI element that performs different navigation actions based on the region the user's finger is held on the joystick UI element. Drag regions of the joystick element may be asymmetrical for ergonomics. For example, dragging up will have denser action regions than horizontally because it may be harder to drag up on the joystick. Exemplary drag regions of the joystick are shown in FIG. 6, diagram 600.

In some embodiments, joystick 514 may include one or more implementation details for interactive GUI navigation. For example, dragging the joystick UI element 514 horizontally may cause the cursor to move within the text editor 502 based on one or more intelligent cursor locations. Intelligent cursor locations may be determined through analysis of the programming language or file type, the state of the text editor, an abstract syntax tree, or a combination thereof. By dragging the joystick vertically, navigation of the cursor may be performed between lines of the text editor 502. As a joystick is dragged further from its center point, navigation between lines increases proportionally. In some embodiments, the size of the joystick dot may change in size accordingly. For example, the larger the distance from the center, the larger the dot. In another embodiment of the joystick 514, a user may tap the joystick element to make an intelligent selection based on the current cursor position. For example, double tapping the joystick in a continuous manner may increase the intelligent selection to contain larger regions, such as one letter or character, one word, one line, multiple lines, or even the entire document. Different variations of intelligent selection may be performed based on a user configurable setting, the syntax of the programming language or file format, or a combination thereof.

In some embodiments, a user may provide input to GUI 500E to navigate via one or more finger/thumb swiping inputs made by the user. For example, a user may swipe their device screen to perform navigation functions within the text editor 502. Intelligent selection of text may include swiping several times to select different regions within a text document. For example, swipe once to select a variable, twice to select a line, three times to select a function, and four times to select an entire section of code. Different variations of swiping may be used to select varying amounts of text with a user's code. In some embodiments, swiping operations may be user configurable.

Figure 5G:
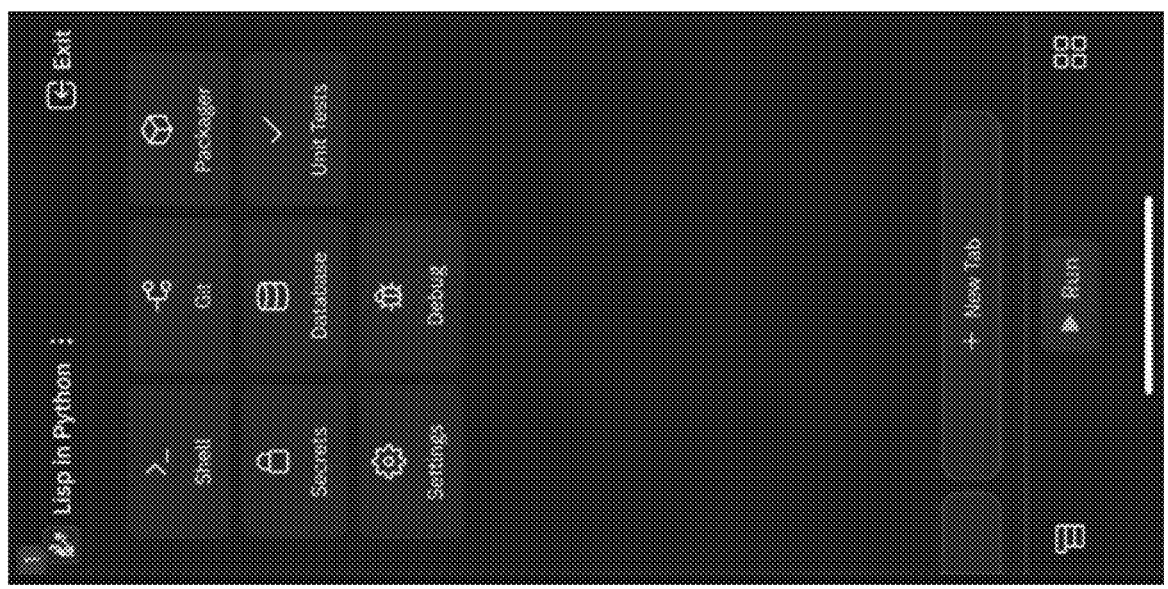
Figure 5H:
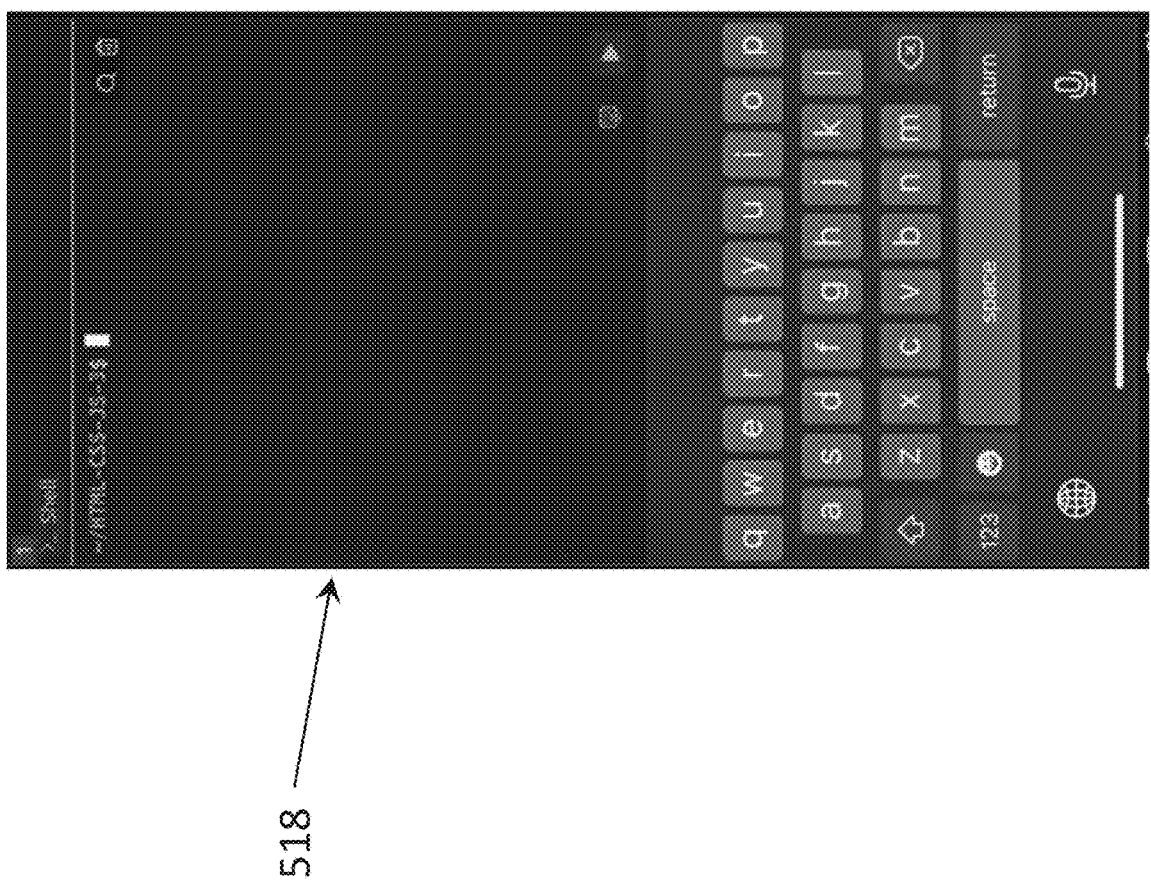
Figure 51:
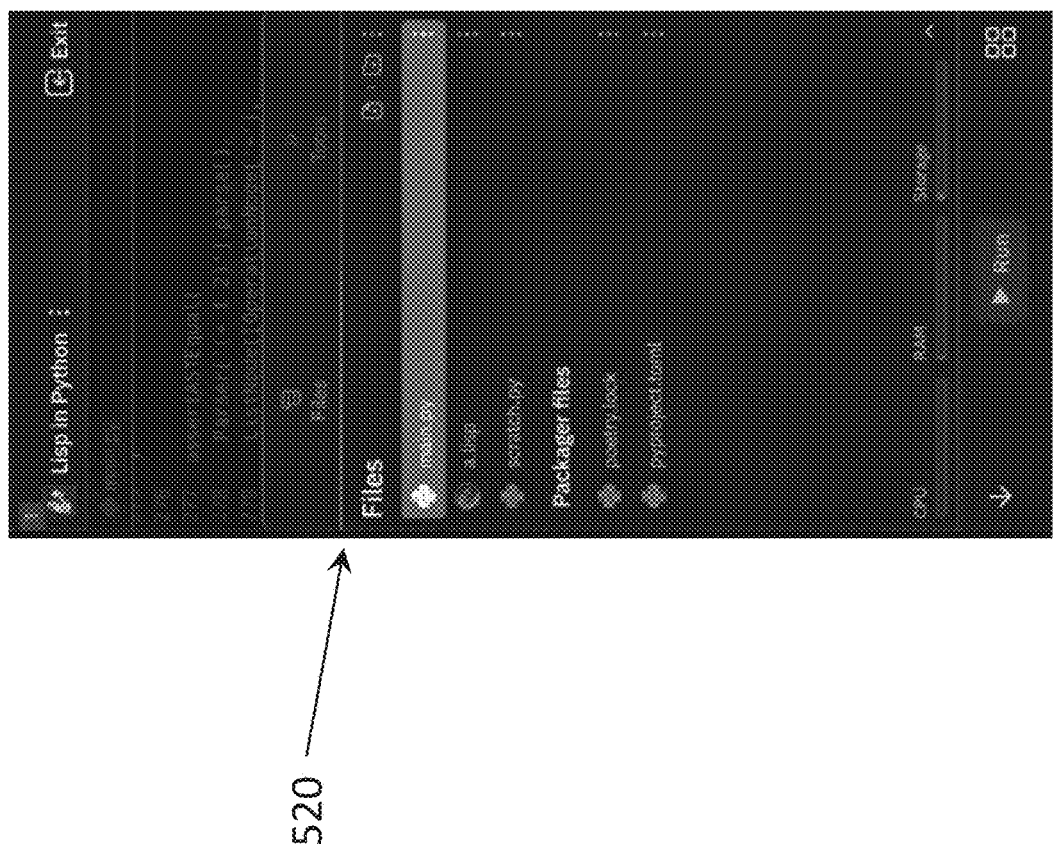

As depicted in FIG. 5G, GUI 500G provides a navigation within the program that may include a number of menu options 516, as shown. Menu options may include, but are not limited to, a shell, a git, a code packager, secrets, database access, unit tests, settings, and a debugger. An example shell 518 is shown in diagram 500H of FIG. 5H. As described herein, menu options may provide additional functionality to the integrated coding container. In some embodiments, a user may perform one or more swiping actions to switch between program files or to navigate within the application, for example, to hide a menu, an interface toolbar, or a mobile keyboard. As shown in diagram 500I of FIG. 5I, a files folder 520 may be provided to the user to open code files, package files, or the like.

Figure 7:
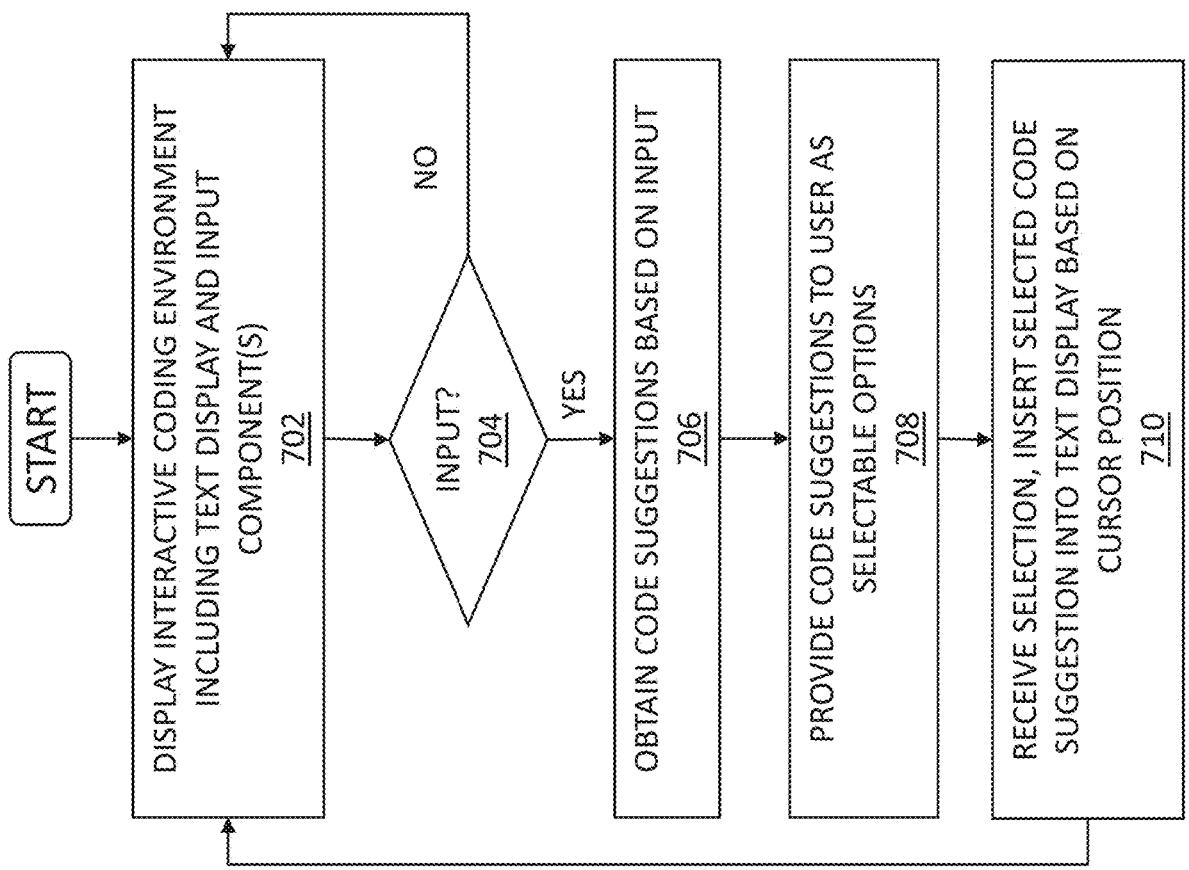
FIG. 7 depicts a flow diagram illustrating a technique for providing a networked ICE in accordance with aspects of the present disclosure.

FIG. 7 shows, in flow chart form, an example method for providing a networked integrated code environment, as described herein. The method may be implemented by interface interactive development environment (IDE) module 108a on a user device, such as user device 106a of FIG. 1. For purposes of explanation, the following steps will be described in the context of FIG. 1. However, the various actions may be taken by alternate components. In addition, the various actions may be performed in a different order. Further, some actions may be performed simultaneously, and some may not be required, or others may be added.

The flow chart begins at 702 where user device 106a may initiate a coding container. Initiating a coding container may include initializing network connections between devices, such as devices 106a-106c, ICE computer 102, and network system 112. Coding container initialization may also include loading several interface elements (e.g., text editor, mobile keyboard, or an autocomplete toolbar) as part of a graphical user interface (GUI), such as IDE interface 108a displayed on user device 106a. Program files and code packages may be stored in a local storage of the user's device and accessed from a cloud storage, a virtual disk, or the like. An instance of the coding container may provide an interactive coding environment to include multiple input options, such as an auto-complete bar, a code suggestions toolbar, a joystick input, or the like.

The flow chart continues at 704, where data input may be received from the user via the user device. Data input may include, but is not limited to, text characters, symbols, file names, file types, user configuration preferences, code comments, function calls, programming languages, menu selections, quick actions selections, text selection or highlighting, input events (e.g., screen tapping or swiping), among others. Based on the received data input, further information may be gathered, such as API libraries, code package libraries, code snippets, or the like. The further information may be stored locally or obtained from a remote storage device, such as code package library 124 of network system 112. When data input is received, the flow chart continues at 706 where user device 106a may obtain, using a predictive model, one or more code suggestions based on the received data input. Additionally, or alternatively, one or more code suggestions may be obtained from a predictive model based on user data (e.g., programming level of experience, demographics), the file or program type of the user's code (e.g., Python, HTML), historical data pertaining to the user, or a combination thereof. The predictive model may be stored and maintained locally on the user device or on an external storage device, such as ICE computing device 102, database 104, or the like.

The flow chart continues at 708, where the code suggestions may be provided to the user as selectable options via IDE interface 108a. In some embodiments, the code suggestions may be caused to be displayed on or within one of the user interface elements of the user's device. The code suggestions may be shown, for example, within a toolbar above or in relation to a user's mobile keyboard. Alternatively, code suggestions may be provided in relation to a text editor interface for easier viewing. In addition to code suggestions, one or more code corrections may be suggested to the user. For example, if an error is detected within the code, a correction may be suggested to the user via the suggestion toolbar. In the alternative, if no suitable correction is available, an alert or notification may be displayed, such as by highlighting an error within the code. Continuing with 710, a user may tap or select one of the code suggestions provided. In response, the text editor may update the displayed text within the IDE interface to reflect the user's selected suggestion. In some embodiments, the user's selections may be logged or tracked by the system. The logged or tracked data may be used as historical data, for example, to create and/or update the predictive model.

In some embodiments, a suggestion may be made to the user based on probable changes (e.g., during a function declaration, suggest a parameter). Auto-completion suggestions are very useful because: a) programming symbols tend to be long and hard to type; b) because of conventions like "camel case" OS auto-completion doesn't help; and c) these symbols are frequently used in writing code. In some embodiments, suggestions may be made based on a user's intent. For example, when a user inputs text, moves a cursor, or selects text, a suggestion may be made via the user's interface. For example, if a user navigates to the import section of a document, additional imports may be suggested. In another example, if a user selects a variable, a prompt may be provided asking if the variable is being defined here and, if so, should it be renamed here and everywhere else that it is referenced?

In some embodiments, a suggestion may be made to navigate to and fix or fill in missing or broken syntax. Coding suggestions to make syntax corrections may be retrieved by the IDE from a library of suggestions, such as code package library 124 shown in FIG. 1. For example, if the user typed "a +" but forgot to indicate what "a" is being added to, a suggestion may be triggered to navigate to this location within the code and make a correction. For example, a cursor shown within the text editor 502 may be repositioned within the code to the location that may need to be fixed, in this example "a +". In some embodiments, portions of code within text editor 502 that may need correcting may be highlighted or flagged. Additionally, suggestions may be provided to not only proactively correct mistakes or omissions, but to also help newcomers to learn more about coding languages or file formats. For example, suggestions may direct the user to fill in missing parentheses and colons for function definitions. Suggestions may be generated based on programming language syntax rules and made available for retrieval by the IDE while the text editor is receiving input. For example, while receiving text input within text editor 502 of FIG. 5A, suggestions may be retrieved by IDE 108a from a storage device, such as program storage 120 or code package library 124 over network 110.

In this example, these suggestions behave like a "fix" feature in IDE errors: 1) Move the cursor to the correct location, 2) Fill in the missing syntax, and 3) Leave the cursor in a convenient location, which isn't always after the insertion (e.g. after inserting missing parentheses, leave the cursor inside the parentheses so the user can add parameters). In this example, suggestions highlight mistakes. In an alternative embodiment, suggestions may be provided as a user types. This may ease the pain of typing in boilerplate and/or switching keyboard modes to get access to characters like parentheses and colons. Additionally, the suggestions may also teach language learners about the language's syntax.

Suggestions examples to correct syntax may include, but is not limited to:
  You just copied some text; do you want to "paste"?;
  You're in a markdown document in a list, do you want to "add a new list item"?;
  You're in a python document in the imports section; do you want "add a new import"?
  You're in a class definition; do you want to "add a new method"?
  You're in a HTML document in an unclosed element; do you want to "add a close angle bracket >" or "add close tag"?

In some embodiments, a suggestion may be provided after a code snippet is inserted into the document. After insertion of the code snippet, the user may interact with the snippet to perform necessary updates. During this interaction, several suggestions may be provided to the user for additional code to add to the snippet. Custom UI may include several options to insert content, update selection/cursor position, and/or display contextual suggestions/pickers. An example class template/snippet may include steps to 1) input class template, 2) move cursor to first slot, and 3) provide suggestions to populate the first slot. A code snippet may be, for example, a Python class declaration with an initializer. The snippet may have at least one slot, such as a class name. In some embodiments, a snippet may have optional slots (e.g., function parameters). The UI would provide easy navigation between the slots. For example, auto-navigation to a next slot on the user's behalf may be provided (e.g., after filling in one slot, move the cursor to the next slot). After a template is inserted, the first slot to be completed may be selected and suggestions may be provided to the user. Additionally, or alternatively, a user may select a slot to complete by tapping on the slot. In some examples, cursor movement may be hard, so slots should have large tap targets and not fine-grained dragging gestures.

In some embodiments, code snippets and other UI elements may have input that is whitespace aware (e.g., auto-manage indentation, adding/removing/ensuring leading/trailing whitespace, if there are buttons to insert operators like "=", "+", etc. ensure there's exactly one space before and after them (per the language or file format).

As described above, in some embodiments, auto-complete suggestions may be shown to a user on a simple user interface element. Suggestions may include code-aware suggestions via Machine learning (ML) and/or artificial intelligence (AI) for the prediction of inputs to be made by a user. In some embodiments, one or more predictive AI/ML models may be created for use by the system. For example, a predictive model may be created using a series of training datasets, such as historical datasets. Historical datasets may be created based on prior coding projects by tracking or logging keystrokes made by computer programmers using the IDE across multiple devices and, in some embodiments, using multiple languages. For example, the training datasets may include, but are not limited to, frequently used functions, code snippets, coding templates, symbols, or the like. Various training datasets may be created based on different characteristics, such as markup or programming language, coding skill level of a programmer, or the like. Based on these training datasets, the predictive model may be trained by correlating information contained within the datasets. For example, certain code snippets or templates may be associated with a program type (e.g., a game), a program language (e.g., Python), and a programmer's skill level (e.g., beginner, intermediate, expert). Over time, as the predictive model is used by the system to provide coding suggestions, the predictive model may be updated by logging keystrokes of the programmer and identifying some, if not all, of the same characteristics used to initialize, detect patterns, and create the predictive model. Additionally, or alternatively, one or more of the predictive AI/ML models may be accessible to multiple devices connected to an interactive development environment over a network. For example, multiple devices, such as devices 106a-106c, may interface with IDE 114 via their respective IDE interfaces 108a-108c over network 150. The predictive model may be stored, for example in program storage 120. In some alternate embodiments, code suggestions or snippets may also include snippets or suggestions that are predefined or user-specific. For example, a programmer may create a coding template that may be re-used for multiple coding projects. A customized coding template may include commonly used syntax, such as classes, objects, function calls, routines, or the like.

Figure 8:
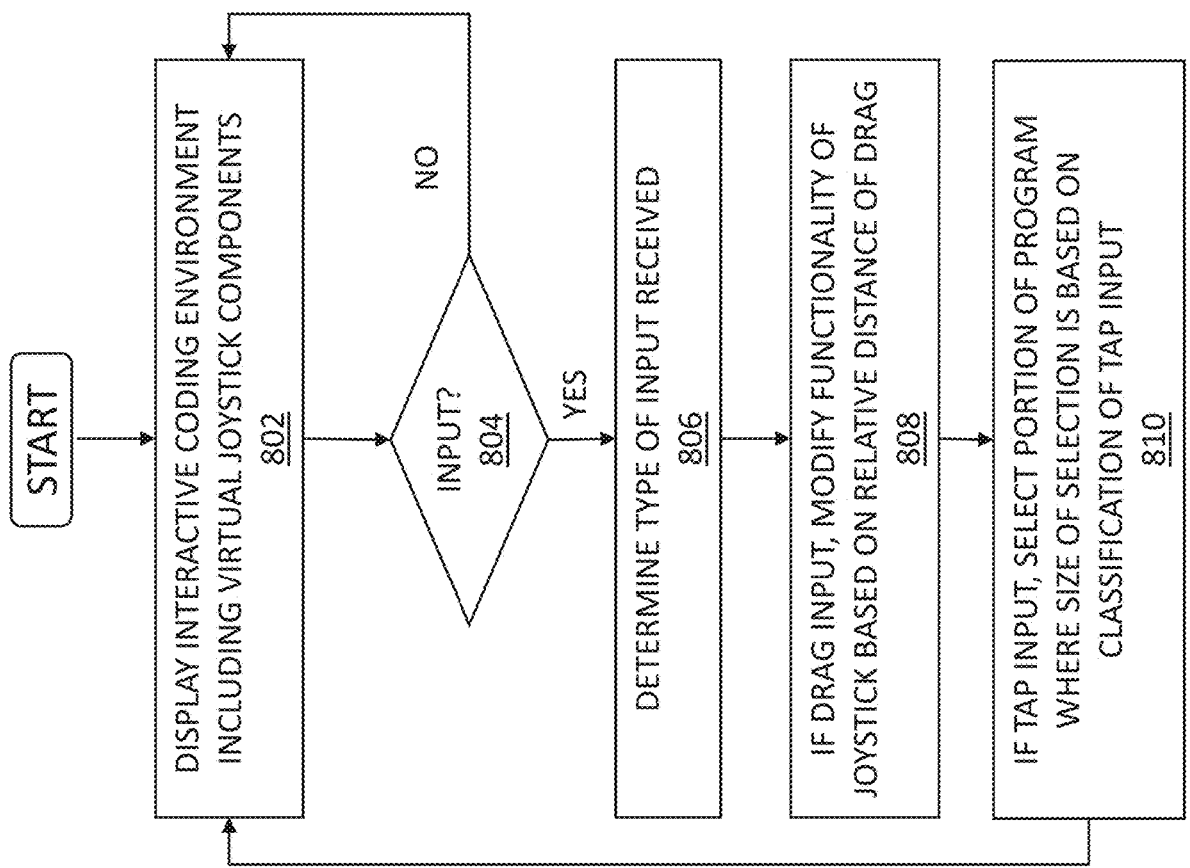
FIG. 8 depicts another flow diagram illustrating a technique for providing a virtual joystick input option in accordance with aspects of the present disclosure.

FIG. 8 shows, in flow chart form, an example method for providing an interactive GUI including virtual joystick control within an integrated development environment (IDE), as described herein. The method may be implemented by IDE interface 108a on a user device, such as user device 106a of FIG. 1. For purposes of explanation, the following steps will be described in the context of FIG. 1. However, the various actions may be taken by alternate components. In addition, the various actions may be performed in a different order. Further, some actions may be performed simultaneously, and some may not be required, or others may be added.

The flow chart begins at 802 where user device 106*a* may initiate a coding container. Initiating a coding container may include initializing network connections between devices, such as devices 106*a*-106*c*, ICE computer 102, and network system 112. Coding container initialization may also include loading several interface elements (e.g., text editor, mobile keyboard, or an autocomplete toolbar) as part of a graphical user interface (GUI), such as IDE interface 108*a* displayed on user device 106*a*. Program files and code packages may be stored in a local storage of the user's device and accessed from a cloud storage, a virtual disk, or the like. An instance of the coding container may provide an interactive coding environment to include multiple input options, such as an auto-complete bar, a code suggestions toolbar, a joystick input, or the like.

The flow chart continues at 804 where if joystick input is not detected, the flow chart goes to 802 and the coding environment continues to be displayed. At 804, if joystick input is detected (YES), the flow chart continues at 806 to determine the type of input received. There may be different types of input received by the virtual joystick from the user of the user device 106*a*. For example, at 808, if a drag input is detected, the functionality of the virtual joystick may be modified. The virtual joystick's functionality may be modified based on a relative distance of the drag from where the virtual joystick is presented on the user's display. As described herein, the virtual joystick may be used to perform navigation functions within the coding environment based on where the user's finger, or other pointing device (e.g., a stylus), is held on the virtual joystick. Dragging the virtual joystick may cause a cursor to move within the coding environment. In one embodiment, the speed of which the cursor moves within the coding environment is directly proportional to the relative distance of the drag from the virtual joystick's center point. Additionally, cursor locations may be determined through analysis of the programming language or file type, the state of the text editor, an abstract syntax tree, or a combination thereof. At 810, when a tap input is received by the virtual joystick a selection of text within the coding environment may be made based on the current cursor position. The size of the text selection (e.g., one letter, one word, one line, one argument, etc.) may be determined based on the tap input received. For example, double tapping of the virtual joystick in a continuous manner may increase the selection to contain larger regions, such as one letter, one word, one line, multiple lines, or even the entire document. Different variations of intelligent selection may be performed based on a user configurable setting, the syntax of the programming language or file format, or a combination thereof.

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning techniques may be used to identify and recognize patterns in existing data in order to facilitate making predictions for subsequent data, such as classifying input, generating new input, or the like. Models may be trained based upon example inputs in order to make valid and reliable predictions for novel inputs.

According to certain embodiments, machine learning models may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs so that when subsequent novel inputs are provided the processing element may, based upon the discovered rule, accurately predict the correct output. In unsupervised machine learning, the processing element may need to find its own structure in unlabeled example inputs.

As will be appreciated based upon the foregoing specification, the above-described embodiments of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer readable medium comprising computer readable code executable by one or more processors to:
   receive a request to access computer code of a program in a development interface;
   obtain a set of intelligent cursor locations in the computer code based on characteristics of the computer code;
   present a virtual joystick component with the computer code in the development interface;
   detect a drag input originating from the virtual joystick component;
   determine, based on a distance of the drag input, a cursor speed;
   control a movement of a cursor within the computer code of the program based on the drag input and the cursor speed; and
   present the movement of the cursor through the intelligent cursor locations in the computer code on a display.

2. The non-transitory computer readable medium of claim 1, further comprising computer readable code to:
receive, via the virtual joystick component, a tap-based input; and
select a portion of the computer code of the program based on the tap-based input.

3. The non-transitory computer readable medium of claim 2, wherein a size of the portion of the computer code selected is based on a classification of the tap-based input.

4. The non-transitory computer readable medium of claim 3, wherein the size of the portion of the computer code selected is selected from a character, a word, a line of code, or multiple lines of code.

5. The non-transitory computer readable medium of claim 1, wherein the cursor speed is directly proportional to the distance of the drag input.

6. The non-transitory computer readable medium of claim 1, wherein the program is presented in a first user interface component, and wherein the virtual joystick component is presented in a second user interface component.

7. A system comprising:
one or more processors; and
one or more computer readable media comprising computer readable code executable by the one or more processors to:
receive a request to access computer code of a program in a development interface;
obtain a set of intelligent cursor locations in the computer code based on characteristics of the computer code;
present a virtual joystick component with the computer code in the development interface;
detect a drag input originating from the virtual joystick component;
determine, based on a distance of the drag input, a cursor speed;
control a movement of a cursor within the computer code of the program based on the drag input and the cursor speed; and
present the movement of the cursor through the intelligent cursor locations in the computer code on a display.

8. The system of claim 7, further comprising computer readable code to:
receive, via the virtual joystick component, a tap-based input; and
select a portion of the computer code of the program based on the tap-based input.

9. The system of claim 8, wherein a size of the portion of the computer code selected is based on a classification of the tap-based input.

10. The system of claim 9, wherein the size of the portion of the computer code selected is selected from a character, a word, a line of code, or multiple lines of code.

11. The system of claim 7, wherein the cursor speed is directly proportional to the distance of the drag.

12. The system of claim 7, wherein the program is presented in a first user interface component, and wherein the virtual joystick component is presented in a second user interface component.

13. A method comprising:
receiving a request to access computer code of a program in a development interface;
obtaining a set of intelligent cursor locations in the computer code based on characteristics of the computer code;
presenting a virtual joystick component with the computer code in the development interface;
detecting a drag input originating from the virtual joystick component;
determining, based on a distance of the drag input, a cursor speed;
controlling a movement of a cursor within the computer code of the program based on the drag input and the cursor speed; and
presenting the movement of the cursor through the intelligent cursor locations in the computer code on a display.

14. The method of claim 13, further comprising:
receiving, via the virtual joystick component, a tap-based input; and
selecting a portion of the computer code of the program based on the tap-based input.

15. The method of claim 14, wherein a size of the portion of the computer code selected is based on a classification of the tap-based input.

16. The method of claim 15, wherein the size of the portion of the computer code selected is selected from a character, a word, a line of code, or multiple lines of code.

17. The method of claim 13, wherein the cursor speed is directly proportional to the distance of the drag input.

* * * * *